Patented Dec. 13, 1927.

1,652,584

UNITED STATES PATENT OFFICE.

ROBERT EMANUEL SCHMIDT, OF ELBERFELD, GERMANY, ASSIGNOR TO GRASSELLI DYESTUFF CORPORATION, OF NEW YORK, N. Y., A CORPORATION OF DELAWARE.

HYDROXYL-ARYL-P-DIAMINO-ANTHRARUFIN COMPOUNDS AND PROCESS OF MAKING SAME.

No Drawing.   Application filed April 13, 1926, Serial No. 101,778, and in Germany April 17, 1925.

My invention consists in new p-diamino-anthrarufin compounds substituted in the nucleus by hydroxy-aryl groups and in the processes of producing these new compounds.

If boric acid is allowed to act upon p-diamino-anthrarufin 2-6-disulfonic acid dissolved in concentrated sulfuric acid boric acid esters are produced; this reaction is accompanied by a very remarkable change of color from yellow to blue, the blue solution of the boric acid esters show furthermore a very characteristic absorption spectrum. If an hydroxy-aryl compound is now added to such blue sulfuric acid solutions of p-diamino-anthrarufin-sulphonic acid boric esters the color again changes to a brownish- or yellowish-red and the absorption spectrum of the boric ester disappears. If the above boric acid esters are decomposed by water, as, for instance, by pouring their sulfuric acid solutions into water, the p-diamino-anthrarufin sulfonic acid is recovered in the form of a blue solution; the yellowish- or brownish-red sulfuric acid solutions when poured into water form, however, greenish or yellowish solutions, containing new compounds. These can be isolated from their sulfuric acid solutions by different methods to be described hereinafter. The p-diamino-anthrarufin sulfonic acids susceptible to this new reaction are of the general type formula

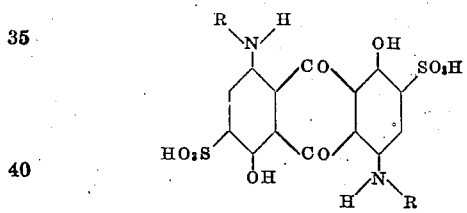

in which R stands for a hydrogen atom or an alkyl group, such as methyl, ethyl, etc.

By the term hydroxy-aryl group I wish to have understood compounds such as phenols, naphthols, phenolethers, naphtholethers etc. The new compounds are, chemically, addition products of one molecule of an hydroxy-aryl compound with one molecule of the p-diamino-anthrarufin sulfonic acid compound. Their chemical constitution is not perfectly known but the most probable assumption is that the addition takes place at one of the carbonyl groups,—graphically, this could be represented by the formula

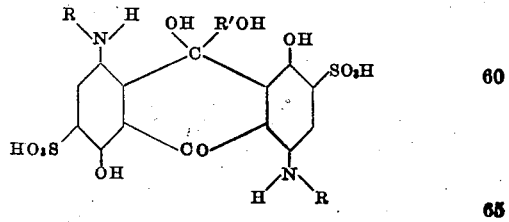

They can be isolated in solid form by precipitating the sulfuric acid reaction melt with glacial acetic acid, or by pouring this melt into water, transforming the sulfuric acid compound into an insoluble salt, filtering this off and evaporating the water solution to dryness, or by any other convenient method. These new addition compounds are, in the solid form, yellowish to brownish substances; they, as well as their alkali and alkali-earth metal salts, are easily soluble in water, soluble in concentrated sulfuric acid with brownish-yellow colorations, and dye wool, after prolonged boiling, blue shades.

If these new hydroxy-aryl addition products are now treated with dilute mineral acid or alkaline agents there occurs a peculiar reaction: the hydroxy-aryl group migrates into the anthraquinone nucleus and takes the place of a sulfonic acid group, which is eliminated in the form of sulfurous acid. This reaction could be graphically represented by the following scheme, as applied to the phenol addition product of the diamino-anthrarufin disulfonic acid:

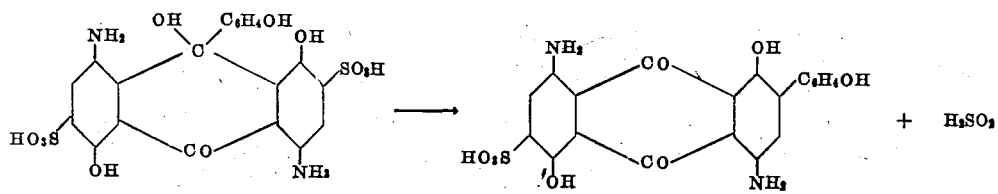

This molecular rearrangement can be effected in different ways, as, for instance, by heating the addition compounds to water bath temperature with dilute mineral acid, in which case the new compounds, which are difficultly soluble in dilute acids, very often separate in crystalline form. Heating the solution of the hydroxy-aryl addition products in soda ash or ammoniacal solution produces the same rearrangement, but caustic alkali is particularly suited to bring about this reaction, which by means of this latter alkaline agent occurs at room temperature, although it is speeded up by heating.

In order to prepare the new aryl-hydroxy-anthraquinone compounds one need not isolate the above described addition products in solid form. If the sulfuric acid solution of the latter, as obtained in their preparation, is poured into water or neutralized with alkali and the solutions so obtained heated, the molecular rearrangement takes place and the aryl-hydroxy-anthraquinone compounds easily can be obtained from the reaction products.

The new aryl-hydroxy-anthraquinone compounds usually form very well crystallizable pyridine salts. They are, in the solid state, dark crystalline powders, soluble in dilute alkalis, soluble in concentrated sulfuric acid usually with a yellow coloration, which, on addition of boric acid, turns greenish-blue and shows new characteristic absorption spectra, in which the lines are more or less shifted according to the nature of the arylhydroxy groups introduced. The new arylhydroxy-diamino-anthrarufin-monosulfonic acid compounds dye unmordanted wool beautiful blue shades of superior fastness to light, perspiration, alkali, salt &c.

The remaining sulfo group of the above diamino-dihydroxy-arylhydroxy-anthraquinone sulfonic acids can also be eliminated and replaced by a hydrogen atom. This can be achieved by heating with dilute acids under pressure, but the most convenient way of splitting off this remaining sulfo group is to reduce the diamino-dihydroxy-arylhydroxy-anthraquinone sulfonic acid to a hydro compound and treat this latter with an alkaline agent as described in my co-pending application Serial No. 101,780 filed April 13, 1926.

Said hydrocompound is obtained by reducing the substituted anthraquinone sulfonic acid in a substantially neutral or weakly alkaline solution, e. g., an aqueous solution of soda ash, potassium carbonate, pyridine, etc. The resulting reduction product is distinguished from its corresponding leuco-compound by the fact that its alkaline solution is not readily oxidized by means of air to form the parent material; it is, however, oxidized in an acid solution,—as for instance by means of persulfates,—into the corresponding anthraquinone sulfonic acid. The distinguishing characteristic of these hydrocompounds which is of the greatest interest, however, is that they will, with the greatest facility, split off a sulfo-group which is eliminated as sulfurous acid or a salt thereof. The splitting off of the sulfo-group may be effected by treatment either with concentrated sulfuric acid or with alkalies, or it may be effected by the application of heat alone. Inasmuch as no definite structural formula can with certainty be assigned to the novel reduction product, it has been designated as a "hydrocompound".

Diamino-dihydroxy-arylhydroxy-anthraquinone compounds having the general graphical formula:

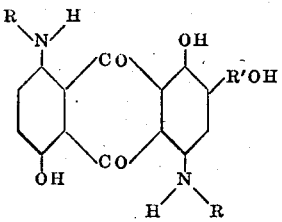

in which R stands for hydrogen or an alkyl group and R' for an aryl radicle are thus obtained.

These new arylhydroxy-anthraquinone compounds are insoluble in aqueous ammonia and in sodium carbonate solution, but soluble in caustic soda solution as well as in organic solvents. They are soluble in sulfuric acid with a yellow coloration which turns blue on addition of boric acid and the latter solution displays an absorption spectrum very similar to that of the parent sulfonic acid. Made up into a paste with water, or in the form of their alkali metal salts, the unsulfonated arylhydroxy compounds dye chrome mordanted wool blue, shades of good fastness properties. When the non-sulfonated arylhydroxy compounds are treated with concentrated sulfuric acid the arylhydroxy group is sulfonated and the sulfonic acids so obtained, which are of the general formula

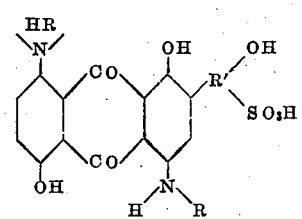

in which R is an alkyl group and R' is an aryl radicle, are isomeric with the diamino-dihydroxy-arylhydroxy-anthraquinone sulfonic acids having the sulfonic group in the anthraquinone nucleus. The dihydroxy-diamino-arylhydroxy-anthraquinone sulfonic acids themselves can be easily sulfonated in the aryl group by treatment with sulfuric acid. Disulfonic acids are so obtained, having the general formula

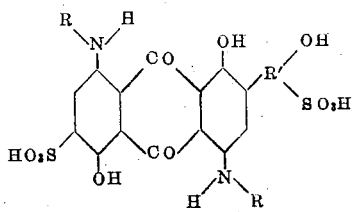

in which R is an alkyl group and R' an aryl radicle. All three types of sulfonic acid compounds are exceedingly similar in their dyeing properties and can be used for the same practical purposes. I include them therefore under the general term of sulfonated alpha-diamino-alpha-dihydroxy-arylhydroxy-anthraquinone compounds, and particularly sulfonated alphadiamino-arylhydroxy-anthrarufin compounds.

The unsulfonated diamino-arylhydroxy-anthrarufin compounds themselves are useful in the production of other valuable dyestuffs.

The following examples will further illustrate my invention, the parts being by weight:

*Example 1.*—20 parts of p-diamino-anthrarufin-2-6-disulfonic acid of the formula are introduced, together with 10 parts of boric acid into 100 parts of 96% sulfuric acid; the mixture is then heated to 70–80° C. until all the diamino-anthrarufin disulfonic acid is dissolved as the boric acid ester. The solution is then cooled to 10° C. and under good stirring 10 parts of ground phenol are added, keeping the temperature below 20° C. The deep blue color of the melt changes gradually into a brownish-red as the phenol dissolves. When there is no further change of color and no more diamino-anthrarufin disulfonic acid can be detected in the melt by spectroscopical examination, the melt is diluted with 175 parts of glacial acetic acid, keeping the temperature at the beginning below 20° C. The addition product separates therefrom as a brownish-yellow precipitate; this is filtered off, stirred up with acetic ester, filtered again, freed from the last traces of sulfuric acid by washing with acetic ester and quickly dried. A yellowish-olive powder is thus obtained which is exceedingly soluble in water with a yellow coloration, addition of caustic soda solution changes this coloration to a cherry red which on prolonged standing or by heating turns to a greenish-blue. The product is soluble in concentrated sulfuric acid with a brownish-yellow coloration; addition of boric acid does not at first modify this coloration, but on standing it changes to a red-brown. It dyes unmordanted wool in an acid bath yellow shades which, on prolonged boiling, change through violet to blue. This new compound has most probably the formula Addition products with resorcinol, pyrocatechin, anisol, naphthols or other aromatic hydroxycompounds are obtained in the same way and have quite similar properties.

*Example 2.*—20 parts of dimethylamino-anthrarufin-2-6-disulfonic acid are introduced with 10 parts of boric acid into 400 parts of 96% sulfuric acid; after all is dissolved, the melt is cooled to about 10–15° C. and with stirring 10 parts of anisol are added. The deep greenish-blue color changes immediately to a cherry-red. The melt is poured into 4000 parts of water and the sulfuric acid neutralized by the addition of precipitated calcium carbonate. The color of the solution is yellow, but as soon as all the sulfuric acid is neutralized a further addition of calcium carbonate turns this color to a reddish-violet, due to the formation of the easily soluble calcium salt of the addition product. The solution is now filtered off from the gypsum, acidified with acetic acid and evaporated to dryness at low temperature in vacuo. The new compound has most probably the formula

*Example 3.*—2 parts of the addition product of phenol and p-diamino-anthrarufin-2-6-disulfonic acid are dissolved in 200 parts of water and 10 parts of 33% caustic soda solution are added. The yellow color of the solution immediately becomes bluish-red and changes to a greenish-blue on prolonged standing at room temperature or on heating on a water bath. When this change has been obtained hydrochloric acid is added; the dyestuff separates and is, after cooling, filtered off and washed with a little cold water. The so obtained compound is difficultly soluble in cold water, and even more so in dilute mineral acids; it is more soluble in hot water, producing a blue solution. It is soluble in caustic soda solution with a greenish-blue coloration. The solution in concentrated sulfuric acid is yellow and becomes blue on addition of boric acid; this latter solution shows an absorption spectrum very similar to that of the p-diamino-anthrarufin-2-6-disulfonic acid. Both can be easily distinguished by the following test: the blue sulfuric-boric solution of the new compound is not modified by the addition of phenol, whereas the blue sulfuric-boric solution of the p-diamino-anthrarufin-2-6-disulfonic acid becomes brownish-red by the addition of phenol due to the formation of the above described addition product. A beautifully crystalline pyridine salt of the new compound is obtained in the following way: the wet precipitate as obtained above is dissolved hot in the requisite amount of pyridine and, upon addition of alcohol, the pyridine salt crystallizes out. The new compound dyes unmordanted wool from an acid bath beautiful blue shades of excellent fastness to perspiration and alkalis. The diamino-hydroxyphenyl-anthrarufin monosulfonic acid so obtained has most probably the formula:

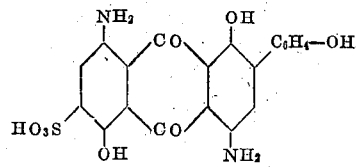

Instead of using caustic soda solution to transpose the phenol addition product into the new compound, the same transposition can also be effected by heating with a soda ash solution or ammonia or even with dilute mineral acids.

*Example 4.*—20 parts of p-diamino-anthrarufin-2-6-disulfonic acid and 10 parts of boric acid are dissolved with heating in 400 parts of 96% sulfuric acid. After complete solution has been obtained and the mass cooled to about 10° C., 10 parts of anisol are added. The color of the solution quickly changes from blue to a brownish-red, indicating the formation of the addition product. The solution is then poured into 2000 parts of water and the yellow solution obtained heated to about 90–95° C.; a beautifully crystalline precipitate soon starts to separate, which precipitate is formed by the displacement of a sulfo group by the anisol radicle and by the concurrent escape of the so liberated sulfur dioxide. This heating is continued for about 2 or 3 hours, when the precipitate does not increase further, the reaction mass is then allowed to cool and, the precipitate is filtered off and washed to neutrality with a little water. A beautifully crystalline pyridine salt is obtained by dissolving the product in pyridine and precipitating with alcohol.

The properties of the product obtained according to the procedure herein set out are similar to those of the phenol derivative of the foregoing example above.

The absorption spectrum of the sulfuric boric acid solution is, compared to that of the phenol derivative, slightly shifted to the red end of the spectrum.

Furthermore it is possible to carefully dilute the reaction melt with an amount of water sufficient to produce a sulfuric acid of from 70–85% and to heat this solution to 90° C. to effect the transposition.

The new diamino-methoxy-phenyl-anthrarufin monosulfonic acid obtained has most probably the formula:

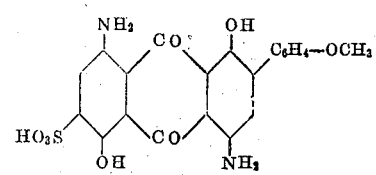

Similar products are obtained in starting from the p-di(methylamino)-anthrarufin-2-6-disulfonic acid and in using other aryloxy compounds such as phenols, cresols, naphthols, etc.

*Example 5.*—10 parts of the pyridine salt of the p-diamino-hydroxy-phenyl-anthrarufin sulfonic acid are stirred up with 280 parts by weight of 20% ammonia and then 2000 parts of water are added. 5½ parts of 86% sodium hydrosulfite are added to the so obtained blue solution. The solution immediately becomes orange and now contains a hydrocompound distinguished from the parent material by the addition of 2 hydrogen atoms in the molecule. This new product can be isolated by salting it out from the above solution. The reaction mass is now slowly heated on the water bath, the color changing gradually to violet and a new compound, formed by the splitting off of a sulfo group, separates as beautiful fine needles. The same reaction also occurs by prolonged standing at ordinary temperatures.

The new compound is filtered off, after the precipitation is complete; it is washed with slightly acidified water and then with pure water. The product can be purified by dissolving the above wet precipitate in pyridine and precipitating it with water; it is obtained in beautiful crystals. Recyrstallizing the dry product from boiling nitrobenzol also yields the product in crystalline form. The new product has most likely the constitution of an hydroxy-phenyl-p-diamino-anthrarufin and may be represented by the graphical formula:

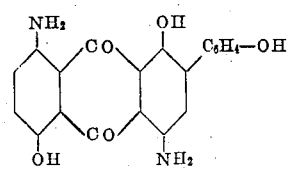

It is insoluble in ammonia or soda ash solutions but soluble in caustic soda solution, particularly on heating, and gives a greenish-blue solution. The solution in sulfuric acid is yellow and turns blue on addition of boric acid; this latter solution shows now an absorption spectrum quite similar to that of the starting material. In paste form or as the sodium salt, the new compound dyes chrome mordanted wool fast blue shades. When this new compound is sulfonated a sulfonic acid is obtained containing the sulfo group in the phenyl radicle.

I claim:

1. In the production of p-diamino-arylhydroxy-anthrarufin compounds the steps comprising treating the sulfuric-boric acid solutions of p-diamino-anthrarufin sulfonic acids of the general formula

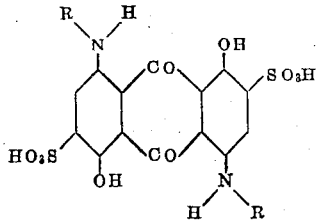

in which R stands for hydrogen or an alkyl group, with hydroxy-aryl compounds and transposing the addition compound obtained so as to migrate the arylhydroxy group into the anthraquinone nucleus with elimination of a sulfo group.

2. In the production of p-diamino-arylhydroxy-anthrarufin compounds the steps comprising treating the sulfuric-boric acid solutions of p-diamino-anthrarufin sulfonic acid of the general formula

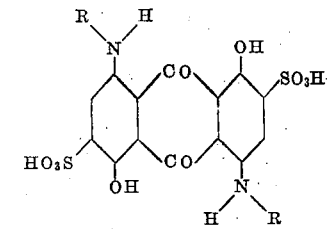

in which R stands for hydrogen or an alkyl group, with hydroxy-aryl compounds and treating the addition compounds obtained with an alkaline agent.

3. In the production of p-diamino-arylhydroxy-anthrarufin monosulfonic acids the steps comprising treating the sulfuric-boric acid solution of the p-diamino-anthrarufin disulfonic acid with a hydroxy-aryl compound and treating the addition compound obtained with an alkaline agent.

4. As new products p-diamino-arylhydroxy-anthrarufin compounds, having an arylhydroxy group attached to the anthraquinone nucleus.

5. As new products sulfonated p-diamino-arylhydroxy-anthrarufin compounds having an arylhydroxy group attached to the anthraquinone nucleus.

6. As new products p-diamino-arylhydroxy-anthrarufin sulfonic acids of the formula

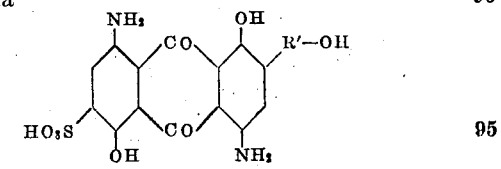

in which R' stands for an aryl group.

7. As new products p-diamino-arylhydroxy-anthrarufin sulfonic acids of the formula

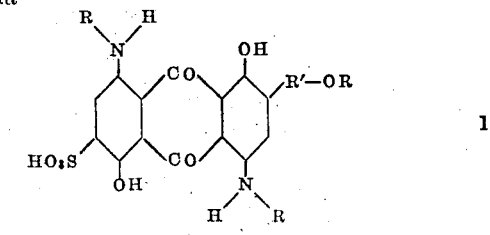

in which R stands for hydrogen or an alkyl group and R' for an aryl group.

In testimony whereof I have hereunto set my hand.

ROBERT EMANUEL SCHMIDT.